(12) United States Patent
Belshan et al.

(10) Patent No.: US 11,859,664 B2
(45) Date of Patent: Jan. 2, 2024

(54) MULTI-PIECE PINION SHAFT ASSEMBLY

(71) Applicant: SPM Oil & Gas, Inc., Fort Worth, TX (US)

(72) Inventors: Daryl James Belshan, Weatherford, TX (US); Jacob Brown, Waller, TX (US); Sri Harsha Uddanda, Lafayette, IN (US); Todd Ryan Kabrich, Tomball, TX (US)

(73) Assignee: SPM Oil & Gas Inc., Fort Worth, TX (US)

( * ) Notice: Subject to any disclaimer, the term of this patent is extended or adjusted under 35 U.S.C. 154(b) by 58 days.

(21) Appl. No.: 17/530,441

(22) Filed: Nov. 18, 2021

(65) Prior Publication Data
US 2023/0151842 A1    May 18, 2023

(51) Int. Cl.
*F16C 3/02* (2006.01)
*F16D 1/072* (2006.01)
*F16H 57/00* (2012.01)

(52) U.S. Cl.
CPC ............. *F16C 3/023* (2013.01); *F16D 1/072* (2013.01); *F16H 57/0025* (2013.01)

(58) Field of Classification Search
CPC .. F16C 3/023; F16C 2226/12; F16C 2226/52; F16D 1/0127; F16D 1/064; F16D 1/072; F16D 1/127; F16H 57/0025; F04D 29/044; F04D 29/054; Y10T 403/4966
USPC .................. 464/182, 183; 403/282
See application file for complete search history.

(56) References Cited

U.S. PATENT DOCUMENTS

| 7,004,730 | B1 * | 2/2006 | Williams .............. F16D 1/076 464/182 |
| 7,155,824 | B2 | 1/2007 | Prucher |
| 7,168,929 | B2 | 1/2007 | Siegel et al. |
| 8,262,491 | B2 | 9/2012 | Burgbacher et al. |

(Continued)

FOREIGN PATENT DOCUMENTS

| DE | 202021101195 U1 * | 7/2021 | .......... F04D 29/054 |
| EP | 1245471 A1 * | 10/2002 | ............. F16D 1/072 |
| GB | 698902 A * | 10/1953 | ............. F16D 1/072 |

OTHER PUBLICATIONS

"Shrink Fitting in Engineering." Air Products PLC. Jun. 24, 2021, [online], [retrieved on Mar. 13, 2023] Retrieved from the Internet <URL: https://web.archive.org/web/20210624121917/https://www.azom.com/article.aspx?ArticleID=20528>.*

*Primary Examiner* — Josh Skroupa (57) ABSTRACT

A pinion shaft assembly for operation in a power end of a reciprocating pump includes a tubular member coupled to first pinion gear member via an interference coupling extension, possibly having a protruding alignment key operable to engage a slot formed on an inner wall of the first end of the tubular member to ensure correct rotational orientation of the first pinion gear member and the tubular member and to help prevent rotation of the first pinion gear member relative to the tubular member. The tubular member is also coupled to a second pinion gear member via an interference coupling extension, possibly having a protruding alignment key operable to engage a slot formed on an inner wall of the second end of the tubular member to ensure correct rotational orientation of the second pinion gear member and the tubular member and to help prevent rotation of the second pinion gear member relative to the tubular member.

19 Claims, 5 Drawing Sheets

(56) References Cited

U.S. PATENT DOCUMENTS

| | | | |
|---|---|---|---|
| 8,876,614 B2* | 11/2014 | Nakamura | F16C 3/023 |
| | | | 464/182 |
| 9,482,285 B2* | 11/2016 | Ramadoss | F16D 1/027 |
| 10,138,925 B2* | 11/2018 | Nakamura | F16D 1/027 |
| 10,563,699 B2 | 2/2020 | Rodriguez | |
| 10,598,210 B2 | 3/2020 | Cheng et al. | |
| 10,612,643 B2 | 4/2020 | Chunn et al. | |
| 2018/0335077 A1* | 11/2018 | Oessenich | F16C 3/026 |
| 2019/0185048 A1* | 6/2019 | Carlini | F16C 3/023 |
| 2020/0318676 A1* | 10/2020 | Itagaki | F16D 1/027 |

* cited by examiner

FIG. 7

MULTI-PIECE PINION SHAFT ASSEMBLY

FIELD

The present disclosure relates to a multi-piece pinion shaft assembly for reciprocating pumps commonly used in hydraulic fracturing applications.

BACKGROUND

Hydraulic fracturing is a process to obtain hydrocarbons such as natural gas and petroleum by injecting a fracking fluid or slurry at high pressure into a wellbore to create cracks in deep rock formations. The hydraulic fracturing process employs a variety of different types of equipment at the site of the well, including one or more positive displacement pumps, slurry blender, fracturing fluid tanks, high-pressure flow iron (pipe or conduit), wellhead, valves, charge pumps, and trailers upon which some equipment are carried.

Positive displacement or reciprocating pumps are commonly used in oil fields for high pressure hydraulic fracturing applications, such as injecting the fracking fluid down the wellbore. A positive displacement pump may include one or more plungers driven by a crankshaft to create flow in a fluid chamber. A positive displacement pump typically has two sections, a power end and a fluid end. The power end includes a crankshaft that changes the rotational motion into linear reciprocating motion to drive the plungers. The crankshaft is mechanically coupled to the input driver via a bull gear and a pinion. The bull gear teeth and the pinion teeth are engaged and enmeshed together to transmit rotational torque. The fluid end of the pump includes cylinders into which the plungers operate to allow fluid into the fluid chamber and then forcibly push the fluid out to a discharge manifold, which is in fluid communication with a well head.

DETAILED DESCRIPTION

Reference is made to FIGS. 1-6 for various views of an example embodiment of a multi-piece pinion shaft assembly 100 according to the teachings of the present disclosure. The pinion shaft assembly 100 includes a linear tubular member 102 with a circular bore and first and second pinion gear members 104 and 106 that are affixed to the two ends of the tubular member 102. The first pinion gear member 104 includes a pinion gear 108 and a generally cylindrical-shaped interference fit coupling extension 110 (FIG. 3) that has an outside diameter that corresponds to an inside diameter of the first end 112 of the tubular member 102 to achieve a tight fit therebetween. The coupling may be achieved by shrink fitting, press fitting, friction fitting, or another suitable interference fitting technique. The interference coupling extension 110 of the first end member 104 further includes an alignment key 114 that corresponds to a slot defined on the inner wall of the first end 112 of the tubular member. The alignment key 114, when disposed in a seat defined in the interference coupling extension 110, protrudes beyond the outside diameter surface of the interference coupling extension 110. The use of the alignment key 114 enables the pinion gear member 104 to be inserted and received into the first end 112 of the tubular member 102 in the correct rotational orientation, and helps to prevent rotation of the first pinion gear member 104 relative to the tubular member 102. The first end 112 of the tubular member 102 further includes a bearing interface 116 proximate to the pinion gear member 104 for receiving roller bearings 502 (shown in FIGS. 5 and 6).

The second pinion gear member 106 includes a pinion gear 120 and a generally cylindrical-shaped interference coupling extension 122 (FIG. 3) that has an outside diameter that corresponds to an inside diameter of the second end 124 of the tubular member 102 to achieve a tight friction fit therebetween. The interference coupling extension 122 of the second pinion gear member 106 further includes an alignment key 126 that corresponds to a slot defined on the inner wall of the first end 124 of the tubular member 102. The alignment key 126, when disposed in a seat defined in the interference coupling extension 122, protrudes beyond the outside diameter surface of the interference coupling extension 122. The use of the alignment key 126 enables the pinion gear member 106 to be inserted and received into the second end 124 of the tubular member 102 in the correct rotational orientation, and helps to prevent rotation of the second pinion gear member 106 relative to the tubular member 102. The second pinion gear member 106 further includes an extended shaft portion 130 for coupling with a power source, such as a motor or engine. The extended shaft portion 130 may include a keyway 132 such as a longitudinally-oriented groove or slot formed therein, splines or any other mechanism that facilitates coupling to the power source. The second end 124 of the tubular member 102 further includes a bearing interface 136 proximate to the pinion gear member 106 for receiving roller bearings 500 (shown in FIGS. 5 and 6).

It should be noted that the alignment key 114, 126 may be implemented with alternate suitable mechanisms such as splines, pins, and threaded engagement. As another example, a spring-loaded detent mechanism disposed in the interference coupling extension of the pinion gear member may engage an indentation formed in the inner wall of the tubular member when the pinion gear member is inserted into the tubular member at the correct depth and correct rotational orientation. Further, the shape of the interference coupling extension of the pinion gear members and the tubular member bore may be non-circular, such as square, hexagonal, octagonal, and any suitable shape. It should be noted that assembling the pinion gear members with the tubular member may include cooling the interference coupling extension and/or heating the tubular member so that the parts may be assembled with minimal interference and force.

Conventional single-piece pinion shaft implementations suffer from disadvantages of having to correct deformation of the shaft due to heat treatment of the gear teeth. Constructed of separate pieces of materials, the tubular member 102, and end members 104 and 106 may be fabricated and machined separately and then assembled together. Rather than being fabricated from a single solid piece of material, the tubular member 102 may be made from a hollow tube with the advantage of a significant reduction in weight. Further, the pinion gear teeth of the pinion gear members 104 and 106 may undergo manufacturing steps such as heat treatment without inadvertently damaging or distorting the shaft. The assembly of the pinion gear members 104 and 106 onto the tubular member 102 may be achieved without the use of torque tools as interference coupling is used without the use of fasteners. Being formed of separate pieces, the pinion gear members may be serviced without replacing the entire pinion shaft component. Because the tubular member and the pinion gear members are fabricated separately, they may be constructed from the same or different materials using the same or different manufacturing processes to achieve optimal results. It should be noted that the interference coupling extensions 110 and 122 and the ends 112 and 124 of the tubular member 102 may have other corresponding shapes such as, for example, rectangular extensions for insertion into rectangular cavities.

Figure 1:
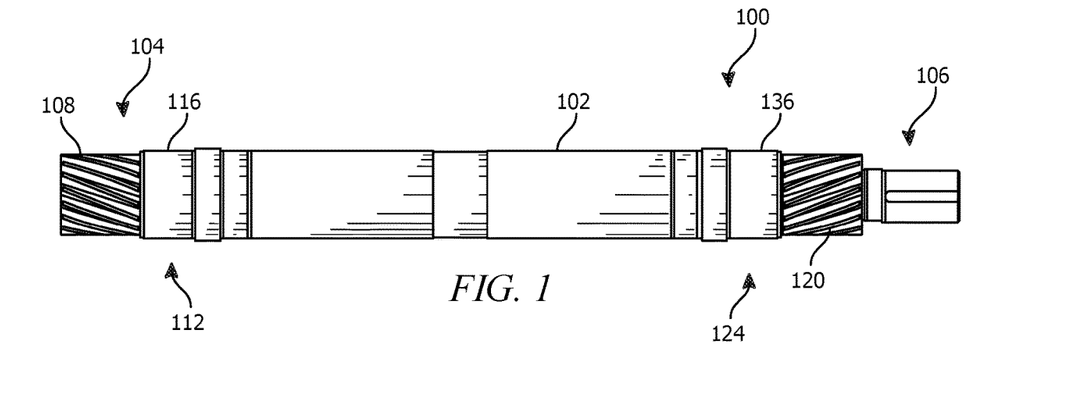
FIGS. 1 and 2 are side and perspective views of an example embodiment of a multi-piece pinion shaft assembly according to the teachings of the present disclosure.
Figure 2:
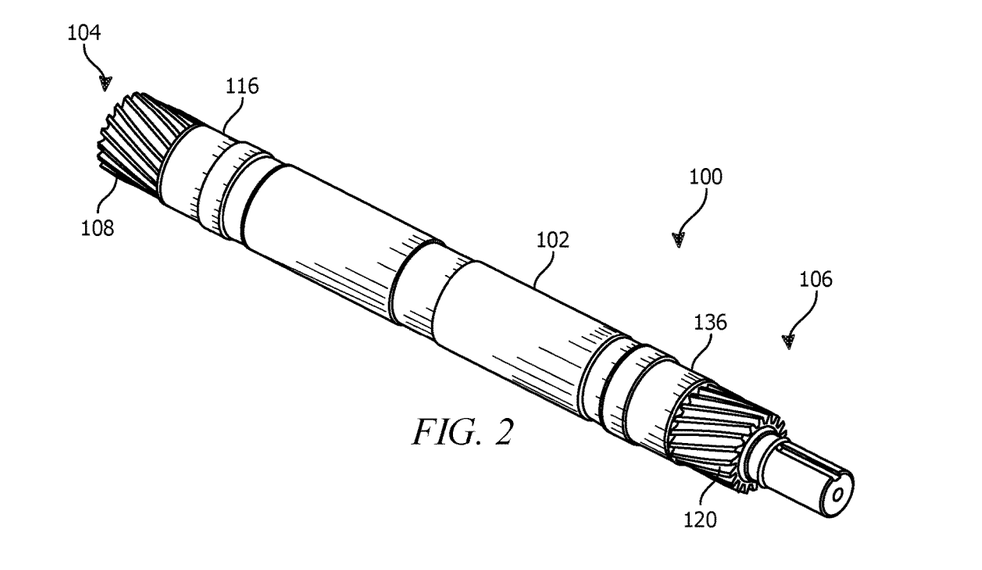
Figure 3:
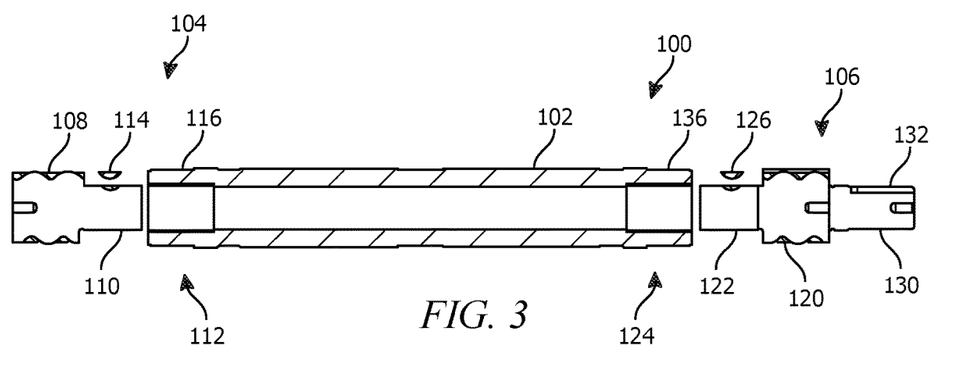
FIG. 3 is cross-sectional side view of an example embodiment of a multi-piece pinion shaft before assembly according to the teachings of the present disclosure.
Figure 4:
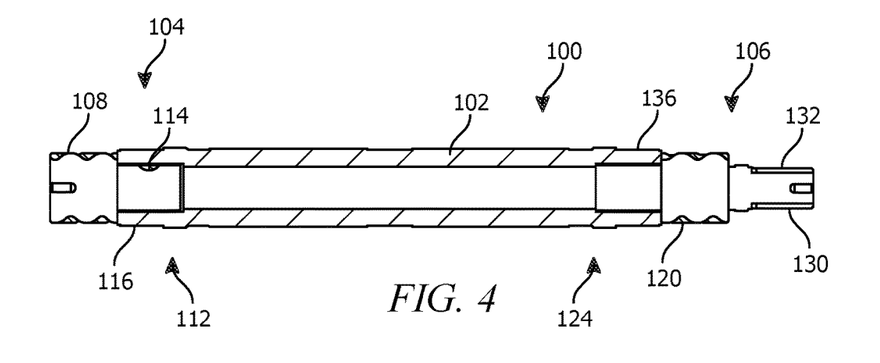
FIG. 4 is cross-sectional side view of an example embodiment of a multi-piece pinion shaft after assembly according to the teachings of the present disclosure.
Figure 5:
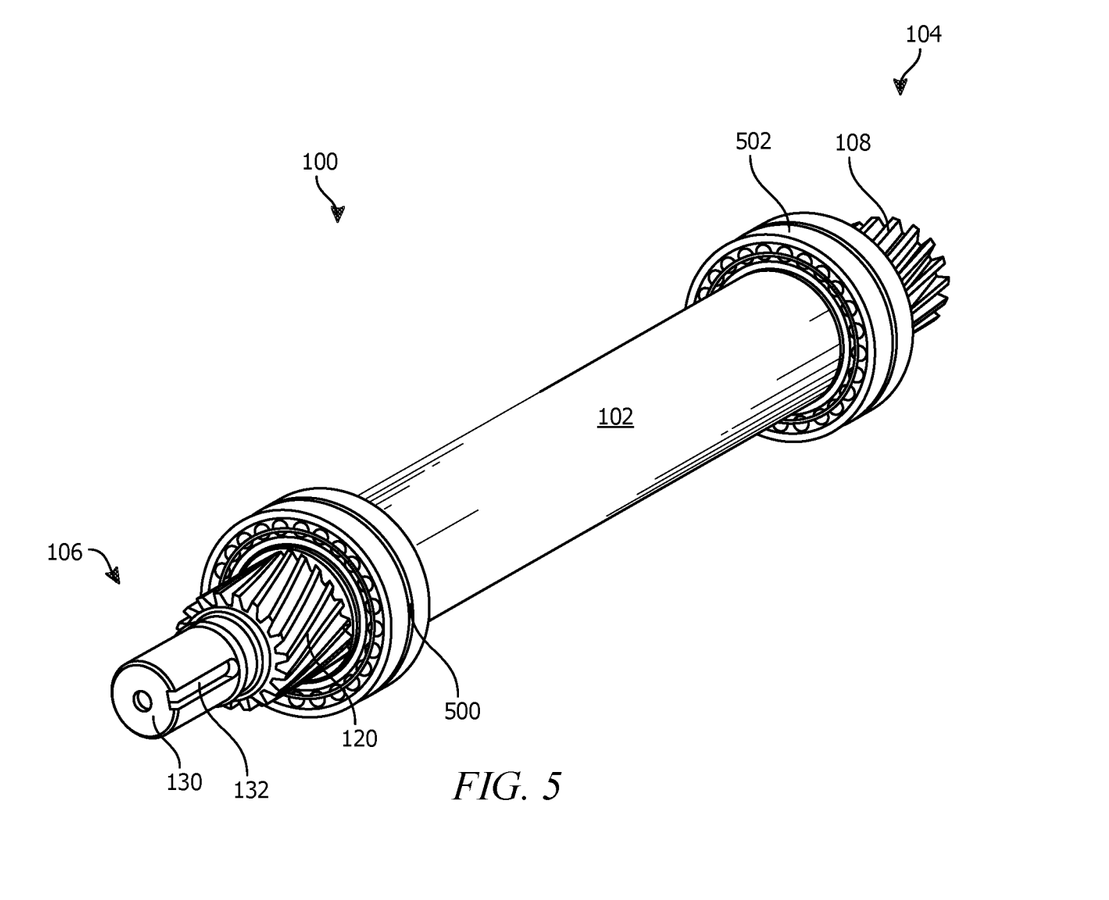
FIGS. 5 and 6 are a perspective view and a cross-sectional view of an example embodiment of a multi-piece pinion shaft assembly with roller bearing assembly according to the teachings of the present disclosure.
Figure 6:
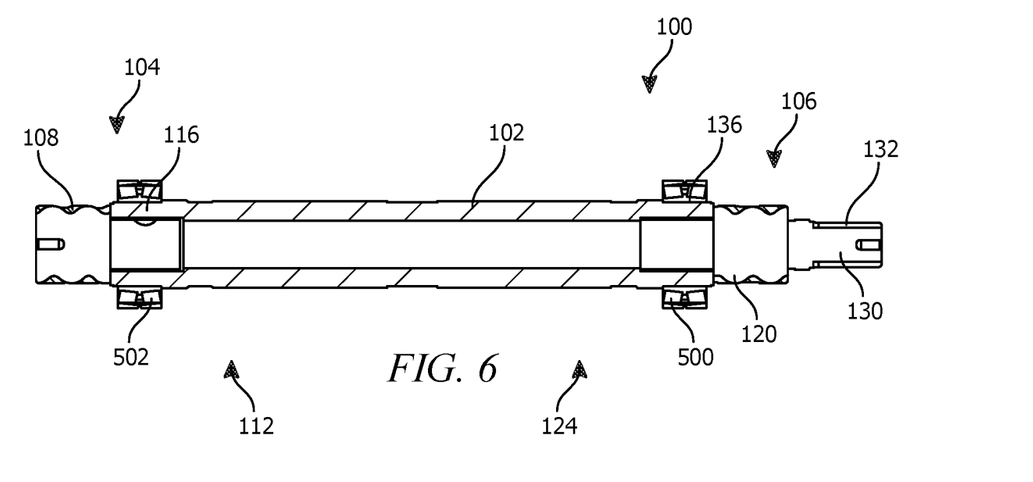
Figure 7:
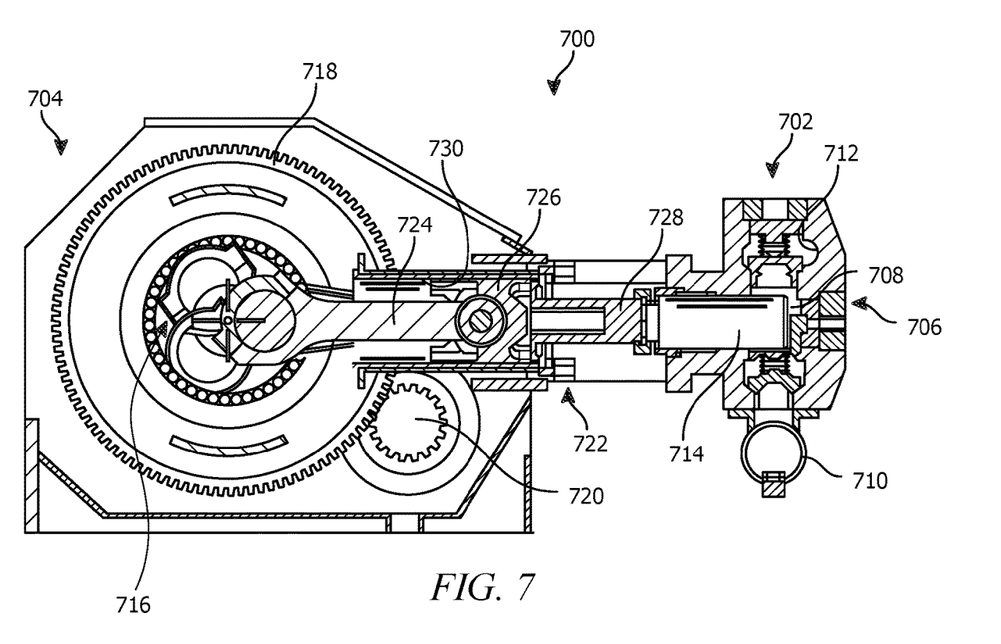
FIG. 7 is a cross-sectional view of a reciprocating pump that incorporates the multi-piece pinion shaft assembly described herein.

FIG. 7 is a cross-sectional view of a reciprocating pump 700 that incorporates the multi-piece pinion shaft assembly 100 described herein. The reciprocating pump 700 includes a fluid end 702 and a power end 704 operably coupled thereto. The fluid end 702 includes one or more cylinders 706, each of which includes a fluid chamber 708. The fluid chambers 708 are in fluid communication with a suction manifold 710 and a discharge manifold 712. The fluid end 702 further includes plungers 714 that operate within the fluid chambers 708. Each plunger 714 is adapted to reciprocate within the corresponding fluid chamber 708 during operation of the reciprocating pump 700. The power end 704 of the reciprocating pump 700 includes a crankshaft 716 that includes one or more crank throws, corresponding to the one or more cylinders 706 of the fluid end 702, and a main shaft. The crank throws are connected to the main shaft and are each offset from the rotational axis of the crankshaft. The crankshaft 716 is mechanically coupled to a power source (not shown) via a bull gear 718 and a pinion 720 (e.g., multi-piece pinion shaft assembly 100). The bull gear 718 is attached to the crankshaft 716 and the pinion 720 is connected to a power source or motor (not shown). The gear teeth of the bull gear 718 mesh with the gear teeth of the pinion 720, thereby transmitting torque therebetween. The crank throws are each coupled to a respective one of the plungers 714 via a mechanical linkage 722, each of which includes a connecting rod 724, a crosshead 726, and a pony rod 728. Each of the crossheads 726 is disposed within a corresponding crosshead bore 730, within which the crosshead 726 is adapted to reciprocate. The connecting rods 724 connect respective ones of the crossheads 726 to respective ones of the crank throws. Further, the pony rods 728 connect respective ones of the crossheads 726 to respective ones of the plungers 714.

In operation, the power source or motor (not shown) rotates the shaft of the multi-piece pinion assembly 100, which rotates the pinion gear teeth of the pinion gear members 104 and 106 that engage the bull gear 718 and the crankshaft 716. The crankshaft 716 rotates the crank throws about the central axis of the main shaft. The crank throws, in turn, are operable to drive the mechanical linkages 722, including respective ones of the connecting rods 724, the crossheads 726, and the pony rods 728, causing the crossheads 726 to reciprocate within the corresponding crosshead bores 730. The reciprocating motion of the crossheads 726 is transferred to respective ones of the plungers 714 via the pony rods 728, causing the plungers 714 to reciprocate within the corresponding fluid chambers 708. As the plungers 714 reciprocate within the respective fluid chambers 708, fluid is allowed into the pressure chambers 708 from the suction manifold 710 and, thereafter, discharged from the pressure chambers 708 into the discharge manifold 712.

The features of the present disclosure which are believed to be novel are set forth below with particularity in the appended claims. However, modifications, variations, and changes to the exemplary embodiments described above will be apparent to those skilled in the art, and the multi-piece pinion shaft assembly described herein thus encompasses such modifications, variations, and changes and are not limited to the specific embodiments described herein.

What is claimed is:

1. A reciprocating pump having a power end and a fluid end, the pump comprising:
   a pinion shaft assembly disposed in the power end, the pinion shaft assembly comprising:
   a tubular member having an inner bore, first and second ends, and at least one bearing surface positioned adjacent the first end of the tubular member, the at least one bearing surface configured to receive at least one roller bearing;
   a bearing shoulder positioned adjacent the at least one bearing surface of the tubular member;
   a first pinion gear member having an interference coupling extension having an outside shape corresponding to an inside shape of the first end of the tubular member to achieve a tight friction fit therebetween such that rotation between the first pinion gear member and the tubular member is substantially prevented when the interference coupling extension is inserted within the first end of the tubular member; and
   a second pinion gear member having an interference coupling extension having an outside shape corresponding to an inside shape of the second end of the tubular member to achieve a tight friction fit therebetween such that rotation between the second pinion gear member and the tubular member is substantially prevented when the interference coupling extension is inserted within the second end of the tubular member,
   wherein the bearing shoulder has an outside diameter greater than an outside diameter of the at least one bearing surface and is configured to prevent movement of a bearing away from the first pinion gear member.

2. The reciprocating pump of claim 1, wherein a shape of the interference coupling extension of at least one of the first and second pinion gear members includes a protruding alignment key operable to engage a slot formed on an inner wall of at least one of the first and second ends of the tubular member to ensure correct rotational orientation of the at least one of the first and second pinion gear members and the tubular member and to help prevent rotation of the at least one of the first and second pinion gear members relative to the tubular member.

3. The reciprocating pump of claim 1, wherein a shape of the interference coupling extension of at least one of the first and second pinion gear members includes a spline operable to engage a spline formed on an inner wall of at least one of the first and second ends of the tubular member to ensure correct rotational orientation of the at least one of the first and second pinion gear members and the tubular member and to help prevent rotation of the at least one of the first and second pinion gear members relative to the tubular member.

4. The reciprocating pump of claim 1, wherein a shape of the interference coupling extension of at least one of the first and second pinion gear members includes a non-circular shape operable to engage a non-circular shape formed on an inner wall of at least one of the first and second ends of the tubular member to ensure correct rotational orientation of the at least one of the first and second pinion gear members and the tubular member and to help prevent rotation of the at least one of the first and second pinion gear members relative to the tubular member.

5. The reciprocating pump of claim 1, wherein the interference coupling extension of at least one of the first and second pinion gear members engages at least one of the first and second ends of the tubular member without using a fastener.

6. The reciprocating pump of claim 1, wherein at least one of the first and second pinion gear members further has an extended shaft portion coupled to a power source operable to rotate the pinion shaft assembly.

7. The extended shaft portion of claim 6, wherein a keyway is used for operation with the power source.

8. The extended shaft portion of claim 6, wherein a spline is used for operation with the power source.

9. A pinion shaft assembly for installation in a reciprocating pump, comprising:
   a tubular member having first and second ends and at least one bearing surface positioned adjacent the first end of the tubular member and configured to receive at least one roller bearing;
   a bearing shoulder positioned adjacent the at least one bearing surface of the tubular member;
   a first pinion gear member coupled to the first end of the tubular member via an interference coupling extension having an outside shape corresponding to an inside shape of the first end of the tubular member to achieve a tight friction fit of the interference coupling extension within the first end of the tubular member such that rotation between the first pinion gear member and the tubular member is substantially prevented; and
   a second pinion gear member coupled to the second end of the tubular member via an interference coupling extension having an outside shape corresponding to an inside shape of the second end of the tubular member to achieve a tight friction fit of the interference coupling extension within the second end of the tubular member such that rotation between the second pinion gear member and the tubular member is substantially prevented,
   wherein the bearing shoulder has an outside diameter greater than an outside diameter of the at least one bearing surface and is configured to prevent movement of a bearing away from the first pinion gear member.

10. The pinion shaft assembly of claim 9, wherein a shape of the interference coupling extension of at least one of the first and second pinion gear members has a protruding alignment key operable to engage a slot formed on an inner wall of at least one of the first and second ends of the tubular member to ensure correct rotational orientation of at least one of the first and second pinion gear members and the tubular member and to help prevent rotation of the at least one of the first and second pinion gear members relative to the tubular member.

11. The pinion shaft assembly of claim 9, wherein a shape of the interference coupling extension of at least one of the first and second pinion gear members has a spline operable to engage a spline formed on an inner wall of at least one of the first and second ends of the tubular member to ensure correct rotational orientation of at least one of the first and second pinion gear members and the tubular member and to help prevent rotation of the at least one of the first and second pinion gear members relative to the tubular member.

12. The pinion shaft assembly of claim 9, wherein a shape of the interference coupling extension of at least one of the first and second pinion gear members has a non-circular shape for a non-circular shape operable to engage a hole for a pin formed on an inner wall of at least one of the first and second ends of the tubular member to ensure correct rotational orientation of at least one of the first and second pinion gear members and the tubular member and to help prevent rotation of the at least one of the first and second pinion gear members relative to the tubular member.

13. The pinion shaft assembly of claim 9, wherein the interference coupling extension of at least one of the first and second pinion gear members engages at least one of the first and second ends of the tubular member without using a fastener.

14. A method for assembling a pinion shaft having multiple parts, comprising:
   providing a tubular member having an inner bore, first and second ends, and at least one bearing surface positioned adjacent the first end of the tubular member and configured to receive at least one roller bearing;
   providing a bearing shoulder adjacent the at least one bearing surface of the tubular member, the bearing shoulder having an outside diameter greater than an outside diameter of the at least one bearing surface;
   providing a first pinion gear member having an interference coupling extension having an outside shape corresponding to an inside shape of the first end of the tubular member to achieve a tight friction fit therebetween such that rotation between the first pinion gear member and the tubular member is substantially prevented when the interference coupling extension is inserted within the first end of the tubular member; and
   providing a second pinion gear member having an interference coupling extension having an outside shape corresponding to an inside shape of the second end of the tubular member to achieve a tight friction fit therebetween such that rotation between the second pinion gear member and the tubular member is substantially prevented when the interference coupling extension is inserted within the second end of the tubular member.

15. The method of claim 14, further comprising:
   cooling the interference coupling extension of at least one of the first and second pinion gear members to reduce its size; and
   aligning and inserting the cooled interference coupling extension of the at least one of the pinion gear members into a corresponding end of the tubular member with minimal interference and force until secure engagement of the two corresponding parts occurs.

16. The method of claim 14, further comprising:
   heating at least one end of the tubular member to increase size of the inner bore; and
   aligning and inserting a corresponding interference coupling extension of at least one of the first and second pinion gear members into at least one heated end of the tubular member with minimal interference and force until secure engagement of the two corresponding parts occurs.

17. The method of claim 14, further comprising assembling the tubular member with the first and second pinion gear members by using a connecting mechanism between the first and second pinion gear members.

18. The method of claim 14, further comprising:
inserting the interference coupling extension of the first pinion member into the first end of the tubular member and securing engagement therebetween without using any fastener; and
inserting the interference coupling extension of the second pinion member into the second end of the tubular member and securing engagement therebetween without using any fastener.

19. The method of claim 14, wherein the method does not include welding the first pinion gear member to the tubular member and does not include welding the second pinion gear member to the tubular member.

* * * * *